United States Patent
Kim et al.

(10) Patent No.: US 7,107,021 B2
(45) Date of Patent: Sep. 12, 2006

(54) METHOD AND APPARATUS FOR TRANSMITTING AND RECEIVING STATUS INFORMATION OF FORWARD CHANNEL IN A MOBILE COMMUNICATION SYSTEM SUPPORTING SELECTIVE TRANSMIT DIVERSITY

(75) Inventors: Youn-Sun Kim, Seoul (KR); Ho-Kyu Choi, Songnam-shi (KR); Hwan-Joon Kwon, Seoul (KR); Dong-hee Kim, Seoul (KR)

(73) Assignee: Samsung Electronics Co., Ltd., (KR)

( * ) Notice: Subject to any disclaimer, the term of this patent is extended or adjusted under 35 U.S.C. 154(b) by 393 days.

(21) Appl. No.: 10/374,492

(22) Filed: Feb. 26, 2003

(65) Prior Publication Data
US 2003/0162511 A1   Aug. 28, 2003

(30) Foreign Application Priority Data
Feb. 26, 2002   (KR) .................. P.10-2002-0010229

(51) Int. Cl.
H04B 1/02   (2006.01)
(52) U.S. Cl. .................... 455/101; 455/69; 455/277.1; 370/282; 370/252
(58) Field of Classification Search .............. 455/101, 455/67.11, 517, 69, 67.13, 420, 425, 424, 455/561, 550.1, 576.1, 456.5, 456.6, 9, 10, 455/95, 121, 129, 123, 68, 70, 83, 63.1, 134, 455/226.1, 226.2, 226.3, 65, 275, 522, 562.1, 455/506, 277.1; 370/281, 334, 342, 343, 370/347, 208, 335, 200, 203, 319, 344, 349, 370/329, 295, 252, 328, 332; 375/267, 299
See application file for complete search history.

(56) References Cited

U.S. PATENT DOCUMENTS
4,996,147 A   2/1991   Furukawa et al.
(Continued)

FOREIGN PATENT DOCUMENTS
EP   0 593 792   4/1994
(Continued)

OTHER PUBLICATIONS
Hottinen et al., "Transmit Diversity by Antenna Selection in CDMA Downlink", Sep. 2, 1998.
(Continued)

Primary Examiner—Edward F. Urban
Assistant Examiner—Charles Chow
(74) Attorney, Agent, or Firm—Dilworth & Barrese LLP

(57) ABSTRACT

A mobile station supporting selective transmit diversity (STD) efficiently transmits forward channel status information to a base station in a 1×EV-DV mobile communication system. The mobile station receives signals transmitted from the base station through a plurality of transmission antennas, measures signal strengths of the received signals, compares the measured signal strengths after compensating for a transmission power difference between the transmission antennas, and selects a transmission antenna having the highest signal strength. The mobile station transmits forward channel status information indicating measured signal strength for a signal transmitted from the selected transmission antenna to the base station along with antenna selection information indicating the selected transmission antenna. The forward channel status information includes absolute status information representing measured signal strength for a transmission antenna selected at a current time interval, or relative status information representing a result obtained by comparing the measured signal strength for the transmission antenna selected at the current time interval with measured signal strength for a transmission antenna selected at a previous time interval.

17 Claims, 9 Drawing Sheets

U.S. PATENT DOCUMENTS

| | | | |
|---|---|---|---|
| 5,175,107 A | 12/1992 | Debabov et al. | |
| 5,538,873 A | 7/1996 | Debabov et al. | |
| 5,631,157 A | 5/1997 | Debabov et al. | |
| 5,939,307 A | 8/1999 | Wang et al. | |
| 6,385,464 B1 * | 5/2002 | Narita et al. | 455/261 |
| 6,898,441 B1 * | 5/2005 | Kogiantis et al. | 455/562.1 |
| 6,915,116 B1 * | 7/2005 | Wang et al. | 455/101 |
| 2001/0050961 A1 * | 12/2001 | Balech | 375/261 |
| 2002/0012380 A1 | 1/2002 | Hottinen et al. | |
| 2003/0043778 A1 * | 3/2003 | Luschi et al. | 370/349 |
| 2003/0148738 A1 * | 8/2003 | Das et al. | 455/67.5 |
| 2003/0157900 A1 * | 8/2003 | Gaal et al. | 455/69 |

FOREIGN PATENT DOCUMENTS

| | | |
|---|---|---|
| EP | 1 085 091 | 3/2001 |
| GB | 1 009 370 | 11/1965 |
| WO | WO 00/09660 | 2/2000 |
| WO | WO 00/41339 | 7/2000 |
| WO | WO 01/69814 | 9/2001 |
| WO | WO 02/26993 | 4/2002 |

OTHER PUBLICATIONS

Hottinen et al., "Transmit Diversity Using Filtered Feedback Weights In The FDD/WCDMA System", Feb. 15, 2000.

Chung C. T. et al., "One step preparation of competent E. coli: Transformation and storage of bacterial cells in the same solution", Proc. Natl. Acad. Sci. USA, 1989, 86: 2172-2175.

Okamoto K. et al., "Hyperproduction of L-threonine by an E. coli mutant with impared L-threonine uptake", Biosc. Biotech. Biochem. 1997, 61, 1877-1882.

Gerdes K., The parB (hok/sok) locus of plasmid R1: a general purpose plasmid stabilization system, Bio/Technology, 1988, 5, 1402-1405.

* cited by examiner

METHOD AND APPARATUS FOR TRANSMITTING AND RECEIVING STATUS INFORMATION OF FORWARD CHANNEL IN A MOBILE COMMUNICATION SYSTEM SUPPORTING SELECTIVE TRANSMIT DIVERSITY

PRIORITY

This application claims priority under 35 U.S.C. §119 to an application entitled "Method and Apparatus for Transmitting and Receiving Status Information of Forward Channel in a Mobile Communication System Supporting Selective Transmit Diversity" filed in the Korean Industrial Property Office on Feb. 26, 2002 and assigned Serial No. 2002-10229, the contents of which are incorporated herein by reference herein.

BACKGROUND OF THE INVENTION

1. Field of the Invention

The present invention relates generally to a mobile communication system supporting voice and data services, and in particular, to a method and apparatus for efficiently transmitting and receiving status information of a forward channel in a mobile communication system supporting selective transmit diversity.

2. Description of the Related Art

A typical mobile communication system, e.g., a code division multiple access (CDMA) mobile communication system, provides only a voice service. However, with the development of a communication technology and at the demand of users, research has been carried out on a mobile communication system for supporting not only the voice service but also a data service. In order to meet such a demand, a 1×EV-DV (Evolution in Data and Voice) mobile communication system has been recently proposed.

In the 1×EV-DV mobile communication system, mobile stations (MSs) measure status of a forward channel from a base station (BS) and each transmits the measurement information to the base station, and the base station determines a destination mobile station that will receive forward packet data, and transmission parameters with which the forward packet data will be transmitted, based on status measurement information of the forward channel, received from a plurality of mobile stations. A reverse channel quality indicator channel (R-CQICH) serves to transmit forward channel status information. Specifically, the forward channel status information is information indicating a carrier-to-interference ratio (C/I) obtained by measuring a pilot channel transmitted in a forward direction.

FIG. 1 illustrates information transmitted over a reverse channel quality indicator channel (R-CQICH) in a common 1×EV-DV mobile communication system. In FIG. 1, a mobile station measures a C/I value of a pilot signal transmitted over a forward pilot channel every 1.25 ms-slot period, and transmits the C/I measurement value over R-CQICH.

In the case where a base station supports selective transmit diversity (STD), a mobile station receives forward pilot signals from two or more base station antennas. In this case, the mobile station transmits a C/I value for a forward pilot channel of an antenna showing a larger C/I value and best antenna selection information indicating a corresponding antenna, to the base station over R-CQICH.

For example, FIG. 1 illustrates a method of transmitting 1-bit antenna selection information over R-CQICH in an STD system using two antennas. That is, a mobile station transmits 4-bit forward channel status information indicating a C/I measurement value and 1-bit best antenna selection information every slot.

A base station receives 4-bit C/I information and 1-bit best antenna selection information every slot, and then determines (i) whether to transmit packet data to a mobile station that has transmitted the information, (ii) data rate, code rate and modulation scheme, to be used for transmission of the packet data in case the base station transmits to the mobile station.

FIG. 2 illustrates a structure of an R-CQICH transmitter in a general 1×EV-DV mobile communication system. Referring to FIG. 2, a mobile station receives a forward pilot channel signal at a C/I measurer 210. The C/I measurer 210 measures a C/I value for the received forward pilot channel signal, and provides the C/I measurement value to a C/I information generator 220. If STD is used, the C/I measurer 210 measures C/I values for all transmission antennas of a base station.

The C/I information generator 220 generates 1-bit best antenna selection information by comparing the C/I measurement values, and generates 4-bit C/I information by quantizing a C/I measurement value selected from the C/I measurement values. The 4-bit C/I information indicates a C/I measurement value for a best antenna having the highest C/I measurement value, and the 1-bit best antenna selection information indicates the antenna having the highest C/I measurement value. If STD is not used, the best antenna selection information is fixed to 0 or 1.

A mapping relationship among the 4-bit C/I information, the 1-bit best antenna selection information, and a C/I measurement value of a forward pilot channel (F-PICH) is illustrated in Table 1.

TABLE 1

| C/I measurement value of F-PICH | C/I information (a4, a3, a2, a1, a0) |
|---|---|
| NULL (Below −14.5 dB, or MS not) | x0000 |
| −14.5 to −13.1 dB | x0001 |
| −13.1 to −11.6 dB | x0010 |
| −11.6 to −10.2 dB | x0011 |
| −10.2 to −8.8 dB | x0100 |
| −8.8 to −7.4 dB | x0101 |
| −7.4 to −5.9 dB | x0110 |
| −5.9 to −4.5 dB | x0111 |
| −4.5 to −3.1 dB | x1000 |
| −3.1 to −1.6 dB | x1001 |
| −1.6 to −0.2 dB | x1010 |
| −0.2 to 1.2 dB | x1011 |
| 1.2 to 2.6 dB | x1100 |
| 2.6 to 4.1 dB | x1101 |
| 4.1 to 5.5 dB | x1110 |
| Above 5.5 dB | x1111 |

In Table 1, one bit in a position a4 represented by x out of the 5-bit information represents best antenna selection information and is used to indicate a transmission antenna having a highest C/I measurement value.

The 4-bit C/I information and 1-bit best antenna selection information generated by the C/I information generator 220 are channel-encoded by a block encoder 230 using a prescribed code rate based on the number of input bits, e.g., a code rate of (12,5). 12 encoded symbols output from the block encoder 230 are Walsh-covered by a Walsh coverer 240 with a prescribed Walsh cover code. The Walsh cover code has a length of 8 bits and is determined by a 3-bit best sector indicator (BSI). The BSI is to indicate a base station (or sector in the case of sector-type base stations) having best forward channel status in an active set, a list of base stations (or sectors in the case of sector-type base stations) with which the mobile station is communicating.

A 96-bit Walsh-covered sequence output from the Walsh coverer 240 is spread by a Walsh spreader 250 with a Walsh code assigned to R-CQICH, and then transmitted to a base station.

In FIG. 2, the 4-bit C/I information and 1-bit best antenna selection information are transmitted every 1.25 ms slot of a reverse channel. When the CQICH is formed in this way, a mobile station using STD must transmit a total of 5 bits in order to report forward channel status to a base station every slot. This amounts to 4,000 bps (=5 bits/1.25 ms) before encoding, cover and spreading is considered, and in a 1×EV-DV system, all mobile stations desiring to receive a packet data service must transmit the information. However, the C/I information transmission method stated above causes a large reduction in reverse transmission capacity by a base station.

SUMMARY OF THE INVENTION

It is, therefore, an object of the present invention to provide a method and apparatus for efficiently transmitting forward channel status by consuming minimum reverse transmission capacity in a mobile communication system supporting STD.

To achieve the above and other objects, the present invention provides a method for measuring, by a mobile station, status of a forward channel and transmitting the measured status information to a base station in a mobile communication system supporting selective transmit diversity (STD). The method comprises receiving forward channel signals transmitted from the base station through a plurality of transmission antennas, and measuring signal strength of each of the received forward channel signals; selecting a transmission antenna having highest measured signal strength by comparing the measured signal strengths, and generating antenna selection information indicting the selected transmission antenna; determining whether it is a slot to transmit an absolute value of the measured signal strength or a relative value of the measured signal strength; and generating forward channel status information based on the determination, and transmitting the generated forward channel status information to the base station along with the antenna selection information.

To achieve the above and other objects, the present invention provides an apparatus for measuring, by a mobile station, status of a forward channel and transmitting the measured status information to a base station in a mobile communication system supporting selective transmit diversity (STD). The apparatus comprises a signal strength measurer for receiving forward channel signals transmitted from the base station through a plurality of transmission antennas, and measuring signal strength of each of the received forward channel signals; a transmission controller for determining whether it is a slot to transmit an absolute value or a relative value; an information generator for selecting a transmission antenna having highest measured signal strength by comparing the measured signal strengths, generating antenna selection information indicating the selected transmission antenna, and generating, based on the determination of the transmission controller, absolute value information indicating measured signal strength for the selected transmission antenna or relative value information indicating a relative value with respect to measured signal strength for a transmission antenna selected at a previous slot; and an encoder for encoding the absolute value information or the relative value information along with the antenna selection information as to transmit.

To achieve the above and other objects, the present invention provides a method for receiving, by a base station, forward channel status information from a mobile station in a mobile communication system supporting selective transmit diversity (STD). The method comprises receiving forward channel status information indicating measured signal strength of a forward channel, and antenna selection information indicating an antenna selected by the mobile station among a plurality of antennas included in the base station; determining whether the forward channel status information is absolute value information representing measured signal strength for the antenna selected by the mobile station or relative value information representing a relative value with respect to measured signal strength for an antenna selected at a previous slot; and updating, based on the determination, previously stored measured signal strength according to the received forward channel status information.

To achieve the above and other objects, the present invention provides an apparatus for receiving, by a base station, forward channel status information from a mobile station in a mobile communication system supporting selective transmit diversity (STD). The apparatus comprises a decoder for decoding a signal received from the mobile station at a prescribed code rate, to recover forward channel status information indicating measured signal strength of a forward channel and antenna selection information indicating an antenna selected by the mobile station among a plurality of antennas included in the base station; a reception controller for determining whether the forward channel status information is absolute value information representing measured signal strength for the antenna selected by the mobile station or relative value information representing a relative value with respect to measured signal strength for an antenna selected at a previous slot; and a memory for replacing previously stored measured signal strength with the absolute value information, if the forward channel status information is the absolute value information, and updatingpreviously stored measured signal strength according to the relative value information, if the forward channel status information is the relative value information.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

Figure 1:
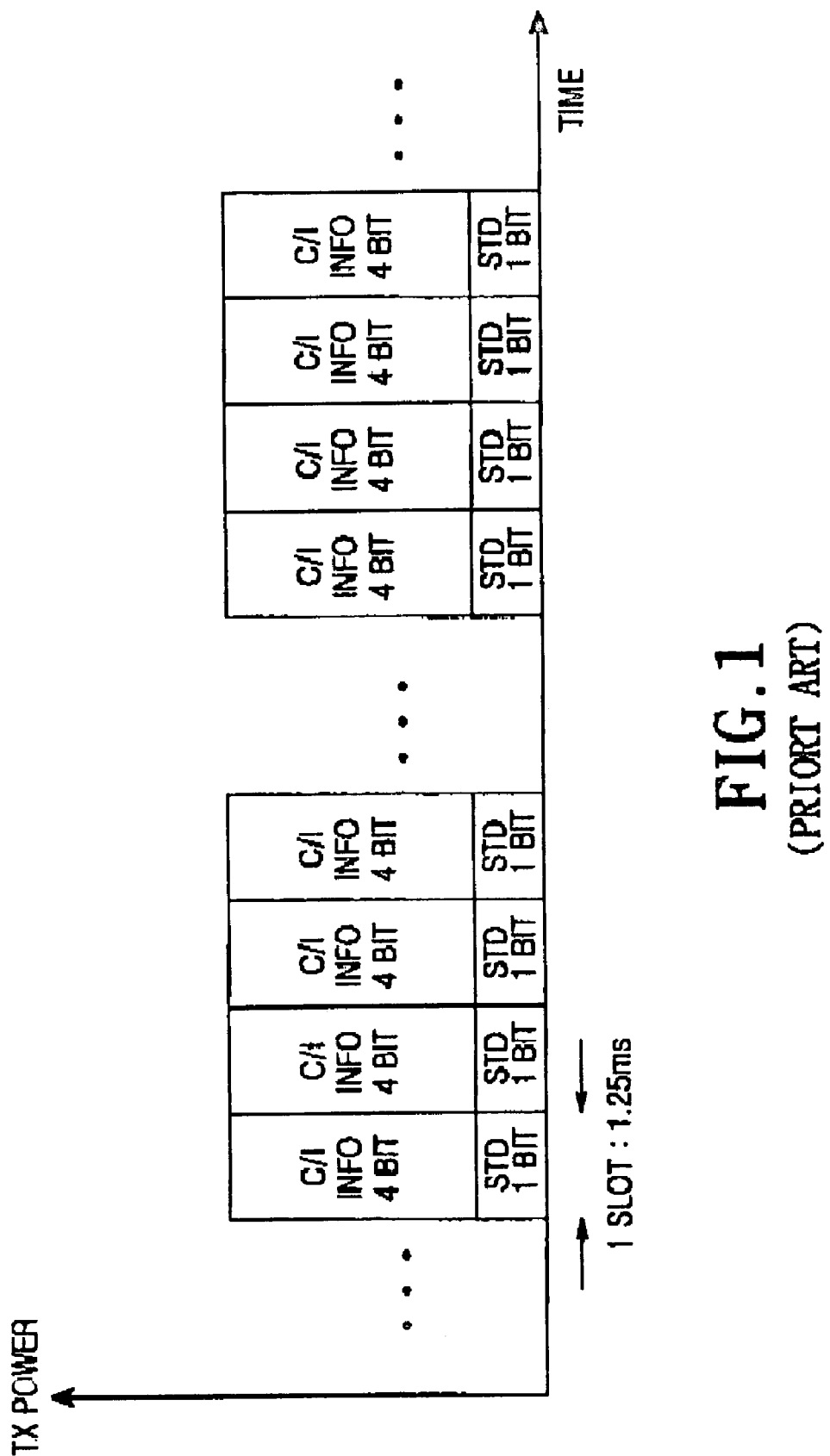
FIG. 1 illustrates information transmitted over a reverse channel quality indicator channel (R-CQICH) in a common 1×EV-DV mobile communication system.
Figure 2:
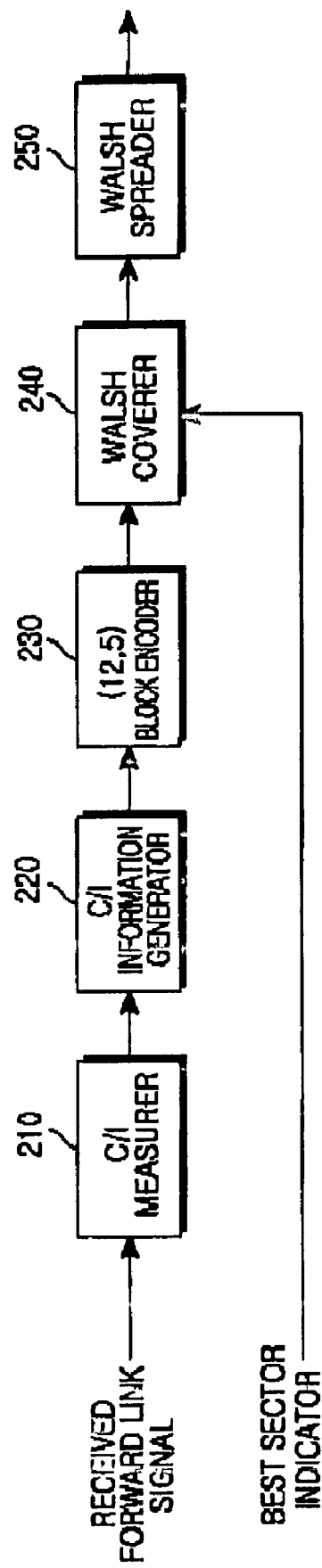
FIG. 2 illustrates a structure of an R-CQICH transmitter in a general 1×EV-DV mobile communication system.

Several preferred embodiments of the present invention will now be described in detail with reference to the annexed drawings. In the drawings, the same or similar elements are denoted by the same reference numerals even though they are depicted in different drawings. In the following description, a detailed description of known functions and configurations incorporated herein has been omitted for conciseness.

In the following description of the present invention, a reverse channel quality indicator channel (R-CQICH) represents a channel for transmitting status information of a forward channel from a mobile station to a base station in a reverse direction.

R-CQICH carries absolute information, i.e., an absolute C/I value, and relative information, i.e., a relative C/I value, determined by measuring signal strength of a forward pilot channel, as forward channel status information. The absolute C/I is a result value obtained by quantizing a C/I value measured at a predetermined slot of a forward channel. The relative C/I is minor bit information representing whether a C/I value measured at a current slot is increased or decreased, by comparing the C/I value measured at the current slot with a C/I value measured at a previous slot. For example, referring back to Table 1, an absolute C/I is comprised of 4 bits and a relative C/I is comprised of 1 bit indicating whether a C/I value at a current slot is higher than a C/I value at a previous slot. An increase/decrease step (or unit) of C/I indicated by the relative C/I is predetermined between the base station and the mobile stations, for example, 1dB.

Further, R-CQICH carries antenna selection information comprised of a predetermined number of bits (e.g., 1 bit when two antennas are used) for selective transmit diversity (STD) every slot. The antenna selection information is used by a mobile station supporting STD to indicate an antenna having the highest C/I value, or a best antenna. In a mobile station not supporting STD, the antenna selection information is fixed to 0 or 1 before being transmitted.

Figure 3:
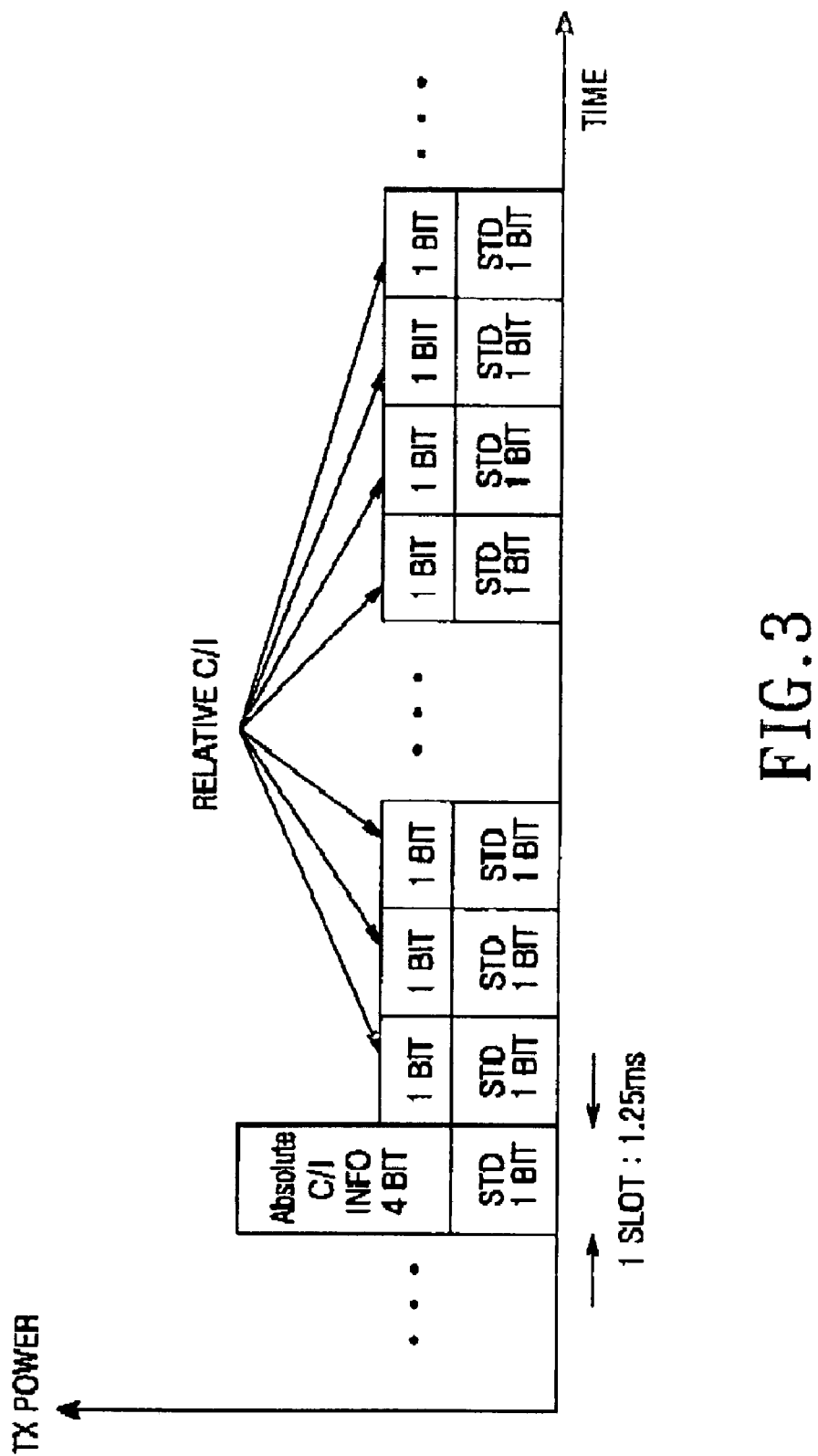
FIG. 3 illustrates information transmitted over R-CQICH in a 1×EV-DV mobile communication system according to an embodiment of the present invention.

FIG. 3 illustrates information transmitted over R-CQICH in a 1×EV-DV mobile communication system according to an embodiment of the present invention. Referring to FIG. 3, a mobile station transmits a 4-bit absolute C/I generated using a C/I value measured at a predetermined slot of a forward pilot channel over a corresponding slot of R-CQICH. The mobile station transmits relative C/I values from the next slots until the next slot where the next absolute C/I will be transmitted. It is preferable to transmit the absolute C/I at a power higher (for example, by two times) than transmission power of the relative C/I.

Upon receiving the antenna selection information and C/I information, a base station transmits packet data to the mobile station based on the last absolute C/I as adjusted by subsequent relative C/I values received, using an antenna having the best forward channel status, thereby maximizing system transmission capacity.

The absolute C/I is transmitted at a periodic time interval, and the period is determined by a system parameter previously set between a mobile station and a base station. A slot position where the absolute C/I is transmitted for each particular mobile station is also determined according to a particular rule previously agreed between the mobile station and the base station.

Specifically, FIG. 3 illustrates a channel structure for the case where one mobile station transmits C/I information. In the case where two or more mobile stations transmit forward channel status information to the same base station, it is important to adjust absolute C/I transmission slots of each mobile station so that absolute C/I values should not be transmitted for the same slot. If two or more mobile stations transmit absolute C/I values for the same slot and at the same time period, then interference will be increased instantly in a reverse link. In order to solve this problem, absolute C/I transmission slots for each mobile station are uniformly dispersed within an absolute C/I transmission period.

Figure 4:
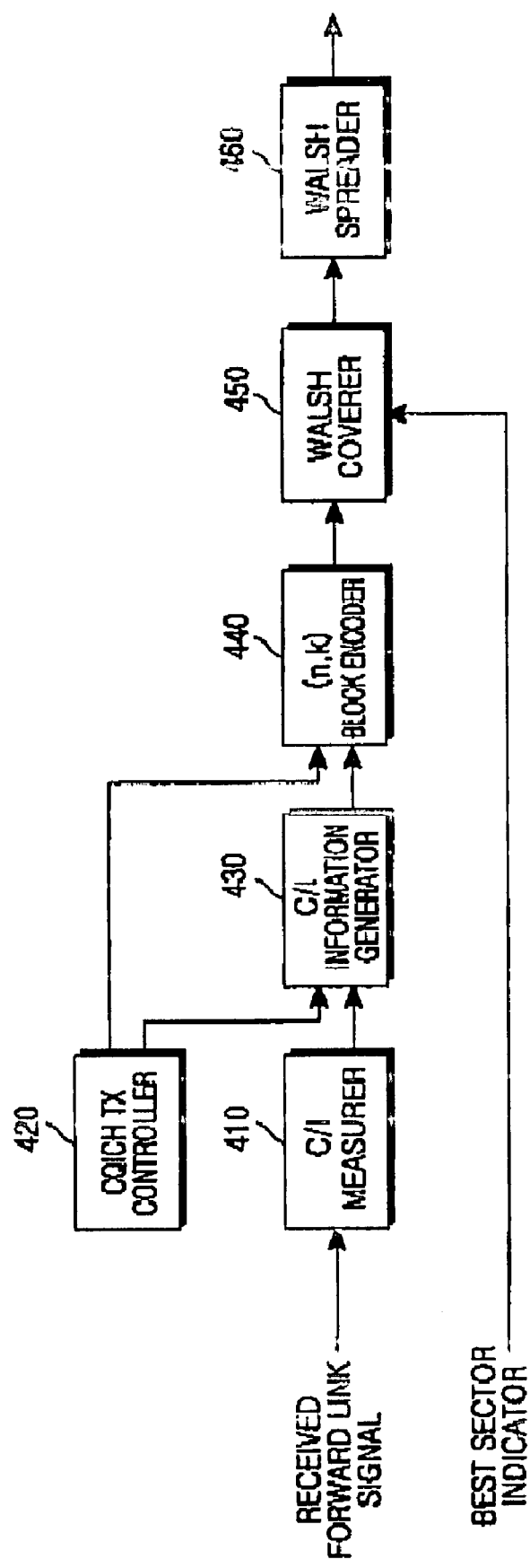
FIG. 4 illustrates a structure of an R-CQICH transmitter for transmitting forward channel status information according to an embodiment of the present invention.

FIG. 4 illustrates a structure of an R-CQICH transmitter for transmitting forward channel status information according to an embodiment of the present invention. Herein, it will be assumed that two base station antennas are used.

Referring to FIG. 4, a C/I measurer 410 measures C/I values for forward pilot channel signals transmitted from two base station antennas. The C/I measurement values are provided to a C/I information generator 430. The C/I information generator 430 generates absolute 4-bit or relative 1-bit C/I information and 1-bit best antenna selection information based on the C/I measurement values. That is, the C/I information generator 430 selects a higher value between the C/I values for the two base station antennas, generates an antenna selection bit (ASB) indicating the selected antenna, and generates 4-bit or 1-bit C/I information for the selected C/I measurement value. Whether the C/I information generator 430 generates a 4-bit absolute C/I or a 1-bit relative C/I is determined by a CQICH transmission controller 420. The CQICH transmission controller 420 determines whether an absolute C/I should be transmitted or a relative C/I should be transmitted, based on the absolute C/I transmission period and the particular position of the absolute C/I transmission slot assigned to the particular mobile station within the period, and informs the C/I information generator 430 of the determined result. Thus, when the slot within a particular time period corresponds to the absolute C/I transmission slot for the particular mobile station, the CQICH transmission controller 420 controls the C/I information generator 430 to generate a 4-bit absolute C/I. For all other slots in the particular time period, the CQICH transmission controller 420 controls the C/I information generator 430 to generate a 1-bit relative C/I.

The generated C/I information (either absolute or relative) is provided to a block encoder 440. The block encoder 440 encodes the C/I information at a code rate of (n,k) and outputs n encoded symbols. The code rate is determined according to the C/I information and the total number of bits of the best antenna selection information, provided to the block encoder 440. For example, when a 4-bit absolute C/I and 1-bit antenna selection information are provided to the block encoder 440, the block encoder 440 uses a code rate of (n,5), and when a 1-bit relative C/I and 1-bit antenna selection information are provided to the block encoder 440, the block encoder 440 uses a code rate of (n,2). Whether the block encoder 440 will use a code rate of (n,5) or a code rate of (n,2) is determined by the CQICH transmission controller 420.

The n encoded symbols output from the block encoder 440 are Walsh-covered by a Walsh coverer 450 using a Walsh code having a length of 8 bits, determined by a 3-bit best sector indicator (BSI). The BSI is to indicate a base station having best forward channel status in an active set, a list of base stations with which the mobile station is communicating.

The Walsh-covered sequence output from the Walsh coverer 450 is spread by a Walsh spreader 460 with a Walsh code assigned to R-CQICH, and then transmitted to a base station.

Figure 5:
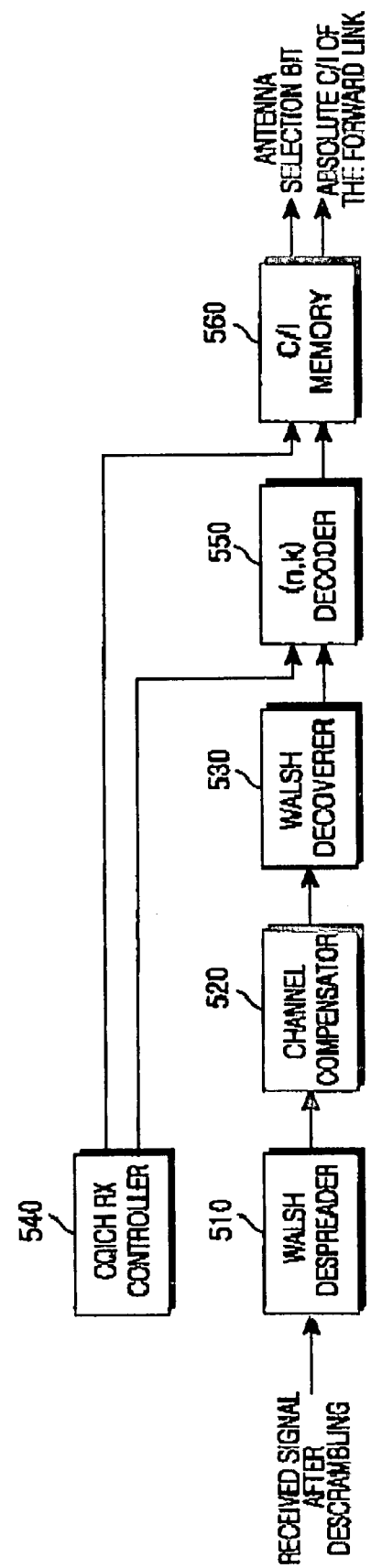
FIG. 5 illustrates a structure of an R-CQICH receiver for receiving forward channel status information from the transmitter of FIG. 4 according to an embodiment of the present invention.

FIG. 5 illustrates a structure of an R-CQICH receiver for receiving forward channel status information from the transmitter of FIG. 4 according to an embodiment of the present invention. Referring to FIG. 5, a CQICH signal received at a base station is Walsh-despread by a Walsh despreader 510 with a Walsh code assigned to CQICH. The despread signal is channel-compensated by a channel compensator 520. The channel-compensated signal is provided to a Walsh decoverer 530. The Walsh decoverer 530 performs Walsh decovering on the channel-compensated CQICH signal with a Walsh code assigned to the base station.

The Walsh-decovered signal is decoded into C/I information and antenna selection information by a block decoder 550 at a code rate of (n,2) or (n,5). The block decoder 550 uses a code rate of (n,5) at an absolute C/I reception slot and uses a code rate of (n,2) at the other slots, based on the slot positions assigned for the particular mobile station. The code rate used by the block decoder 550 is selected by a CQICH reception controller 540.

Specifically, the CQICH reception controller 540 selects a code rate of (n,5) at a slot where a 4-bit absolute C/I and 1-bit best antenna selection information are transmitted, and selects a code rate of (n,2) at a slot where a 1-bit relative C/I and 1-bit best antenna selection information are transmitted. To this end, an absolute C/I transmission period and a transmission slot position are previously agreed between a mobile station and a base station.

The C/I information and antenna selection information output from the block decoder 550 are provided to a C/I memory 560. If the provided C/I information is a 4-bit absolute C/I, the C/I memory 560 deletes previously stored C/I information, and then refreshes the received 4-bit absolute C/I (or replaces the previously stored C/I information with the received 4-bit absolute C/I). However, if the received C/I information is a 1-bit relative C/I, the C/I memory 560 increases or decreases the previously stored C/I information by a prescribed step according to the received relative C/I. The C/I information increase/decrease step is previously (before call initiation) set between a base station and a mobile station. The C/I memory 560 does not distinguish to which antenna the C/I information belongs, and the antenna selection information is used as a criterion for selecting an antenna to be used when transmitting packet data from a base station to the mobile station.

Figure 6:
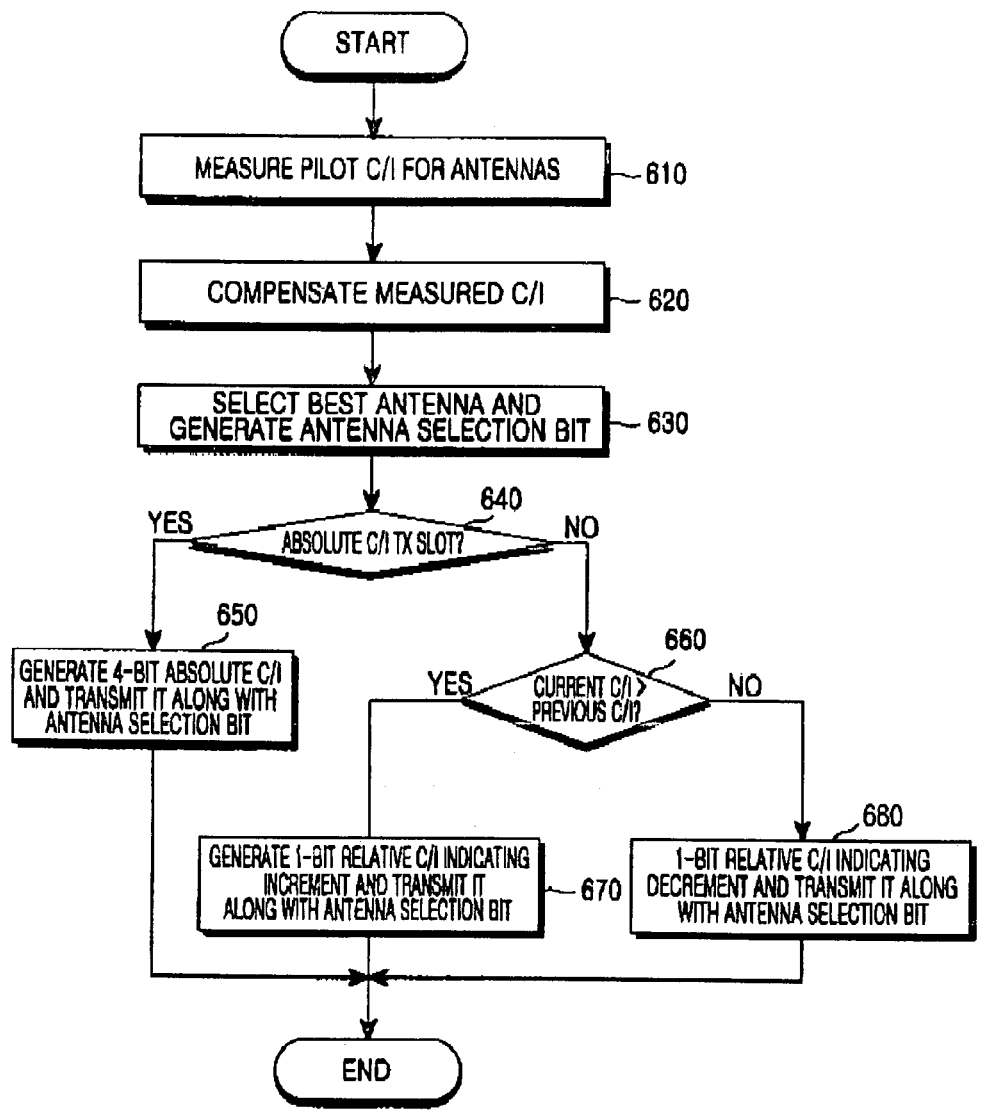
FIG. 6 is a flowchart illustrating an operation of transmitting forward channel status information and antenna selection information by the transmitter of FIG. 4 according to an embodiment of the present invention.

FIG. 6 is a flowchart illustrating an operation of transmitting forward channel status information and antenna selection information by the transmitter of FIG. 4 according to an embodiment of the present invention. Referring to FIG. 6, in step 610, a mobile station calculates forward C/I measurement values by measuring strengths of pilot signals transmitted from two base station antennas every slot of a forward pilot channel by the C/I measurer 410. The forward C/I measurement value means an average C/I measurement value calculated at a corresponding slot.

If the forward pilot channels transmitted from the antennas have different transmission power levels, the mobile station compensates in step 620 the two C/I measurement values before comparison. The compensation is performed by adding or subtracting a transmission power difference between the antennas to or from one of the C/I measurement values obtained by measuring pilot channels transmitted from the two antennas.

For example, a base station having a first antenna and a second antenna transmits a forward channel signal through the first antenna at transmission power of (a) dB and transmits a forward channel signal through the second antenna at transmission power of (a−3) dB. That is, the first antenna and the second antenna have a power difference of 3 dB. In this case, if it is assumed that the forward channel signals are received at the mobile station with a transmission loss and thus a C/I measurement value for the first antenna is defined as (x) dB and a C/I measurement value for the second antenna is defined as (y) dB, then the mobile station reduces the C/I measurement value for the first antenna by 3 dB or increases the C/I measurement value for the second antenna by 3 dB in order to compare the C/I measurement values received from the two antennas. Generally, the mobile station increases the C/I measurement value for the second antenna having the lower transmission power level by the transmission power difference of 3 dB. The base station has already notified the mobile station of the transmission power difference, when the communication between the mobile station and the base station is initiated.

In step 630, the mobile station selects an antenna having best forward channel status by comparing the compensated C/I measurement values, and generates an antenna selection bit indicating the selected antenna. In step 640, the mobile station determines whether it will transmit a 4-bit absolute C/I or a 1-bit relative C/I at a current slot. The determination on whether it will transmit an absolute C/I or a relative C/I is made according to the time period and absolute slot position previously set between a base station and a mobile station.

If it is determined to transmit an absolute C/I in step 640, the mobile station generates an absolute C/I using the compensated C/I measurement value for the selected antenna in step 650. For the absolute C/I, C/I information mapped to the C/I measurement value is selected from the mapping table of Table 1. In Table 1, among the C/I information bits a0–a4, the bit a4 represents antenna selection information, so the other bits a3–a0 become absolute C/I information. The 4-bit absolute C/I generated in this method is transmitted to the base station along with 1-bit best antenna selection information 'a4' indicating the selected antenna.

Otherwise, if it is determined to transmit a relative C/I in step 640, the mobile station determines in step 660 whether a C/I measurement value at a current slot is higher or lower than a C/I measurement value at a previous slot. For this, the mobile station compares a C/I measurement value at a current slot with a C/I measurement value at a previous slot. As a result of the comparison, if an average C/I measurement value for the current slot is higher than an average C/I measurement value for the previous slot, the mobile station generates in step 670 a 1-bit relative C/I value (of, for example, '1') indicating increment of the C/I measurement value, and transmits the generated 1-bit relative C/I to the base station along with the antenna selection information indicating the selected antenna. Otherwise, the mobile station generates in step 680 a 1-bit relative C/I value (of, for example, '0') indicating decrement of the C/I measurement value, and transmits the generated 1-bit relative C/I to the base station along with the antenna selection information indicating the selected antenna.

Figure 7:
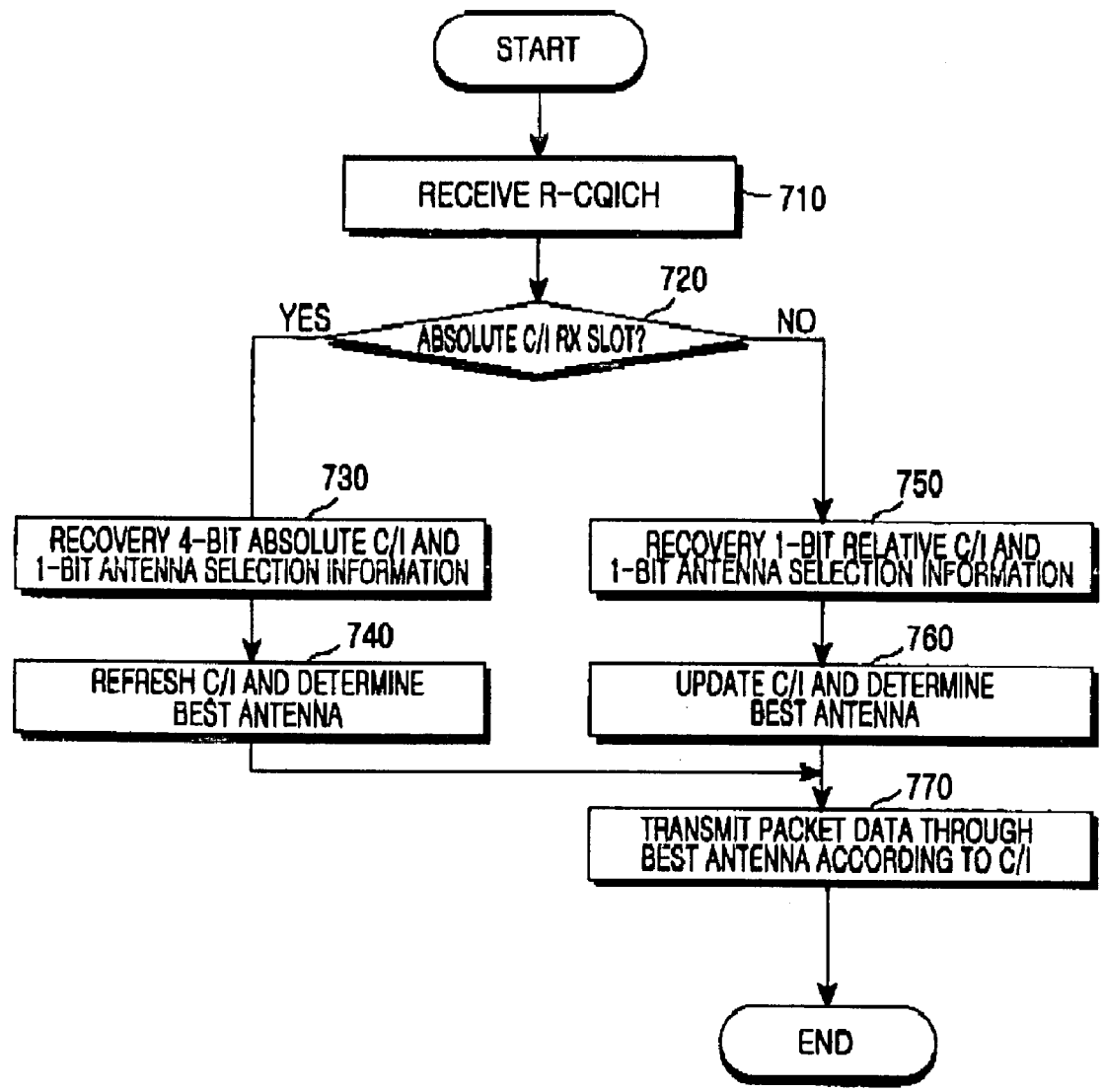
FIG. 7 is a flowchart illustrating on operation of receiving forward channel status information and antenna selection information by the receiver of FIG. 5 according to an embodiment of the present invention.

FIG. 7 is a flowchart illustrating an operation of receiving forward channel status information and antenna selection information by the receiver of FIG. 5 according to an embodiment of the present invention. Referring to FIG. 7, a base station receives an R-CQICH signal every-slot in step 710, and determines in step 720 whether a current time period (or slot) is an absolute C/I reception slot or a relative C/I reception slot for the particular mobile station transmitting the signal, in order to analyze the CQICH signal.

If it is determined in step 720 that the current slot is an absolute C/I reception slot, the base station decodes in step 730 the CQICH signal into a 4-bit absolute C/I and an antenna selection bit by means of a block decoder using a code rate of (n,5). The absolute C/I obtained in step 730 is used to refresh a previously stored C/I measurement value in step 740. Thereafter, the base station proceeds to step 770. In step 770, the base station selects a destination mobile station using stored C/I measurement values received from all mobile stations including the above mobile stations, determines transmission parameters, such as a data rate, a code rate and a modulation scheme, used for transmission of forward packet data to the destination mobile station, and transmits the forward packet data through a transmission antenna that indicated by the antenna selection information reported from the destination mobile station.

However, if it is determined in step 720 that the current time period is a relative C/I reception period, the base station decodes in step 750 the CQICH signal into a 1-bit relative C/I and an antenna selection bit by means of a block decoder using a code rate of (n,2). The relative C/I obtained in step 750 is used when the base station updates a previously stored C/I measurement value in step 760. Thereafter, the base station proceeds to step 770. In step 770, the base station selects a destination mobile station using stored C/I measurement values received from all mobile stations including the above mobile stations, determines transmission parameters, such as a data rate, a code rate and a modulation scheme, used for transmission of forward packet data to the destination mobile station, and transmits the forward packet data through a transmission antenna indicated by the antenna selection information reported from the destination mobile station.

Figure 8:
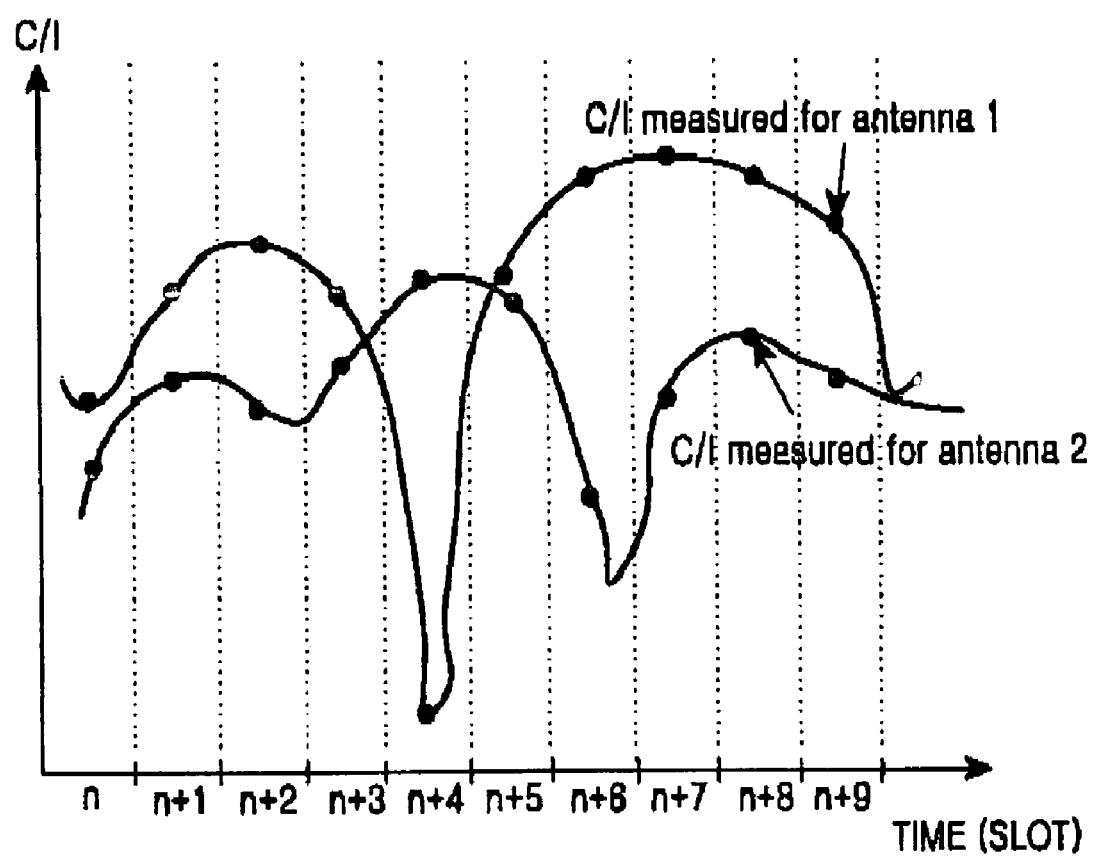
FIG. 8 is a graph illustrating a time variation in forward C/I measurement values for two transmission antennas of a base station.

A description will now be made of a preferred embodiment of the present invention with reference to FIG. 8 that illustrates a time variation in forward C/I measurement values for two transmission antennas of a base station. As mentioned before, in order to compare C/I measurement values received from two transmission antennas of a base station and generate an absolute C/I or a relative C/I based on the comparison result, it is desirable to compensate the C/I measurement values considering a transmission power difference between the two transmission antennas of the base station, and the compensated C/I measurement values are illustrated in FIG. 8.

Information that a mobile station transmits to a base station over R-CQICH is illustrated in Table 2.

TABLE 2

| Time (Slot #) | n | n + 1 | n + 2 | n + 3 | n + 4 |
|---|---|---|---|---|---|
| C/I Info | Absolute C/I | Relative C/I | Relative C/I | Relative C/I | Relative C/I |
| Best Antenna Selection Info | First antenna indicated | First antenna indicated | First antenna indicated | First antenna indicated | Second antenna indicated |
| Time (Slot #) | n + 5 | n + 6 | n + 7 | n + 8 | n + 9 |
| C/I Info | Relative C/I | Relative C/I | Relative C/I | Relative C/I | Relative C/I |
| Best Antenna Selection Info | First antenna indicated | First antenna indicated | First antenna indicated | First antenna indicated | First antenna indicated |

That is, an antenna selection bit indicates a first antenna from an $n^{th}$ slot to an $(n+3)^{th}$ slot, since a C/I measurement value for the first antenna is larger than a C/I measurement value for the second antenna. However, the antenna selection bit indicates a second antenna at an $(n+4)^{th}$ slot, since the C/I measurement value for the first antenna is decreased smaller than the C/I measurement value for the second antenna. As a result, at the $(n+4)^{th}$ slot, a mobile station generates a relative C/I by comparing the C/I measurement value for the second antenna, measured at the $(n+4)^{th}$ slot, with the C/I measurement value for the first antenna, measured at the $(n+3)^{th}$ slot, without the need to transmit an absolute C/I measured for the second antenna, and then transmits the generated relative C/I to the base station.

The base station then receives the relative C/I for the second antenna and calculates a C/I measurement value for the second antenna for the n+4 slot based on a previously stored C/I measurement value for the first antenna for the n+3 slot.

As described in conjunction with FIGS. 5 to 8 and illustrated in Table 2, a mobile station supporting STD transmits a relative C/I or an absolute C/I for only one best antenna having the highest C/I measurement value every slot when notifying a base station of forward channel status information.

Figure 9:
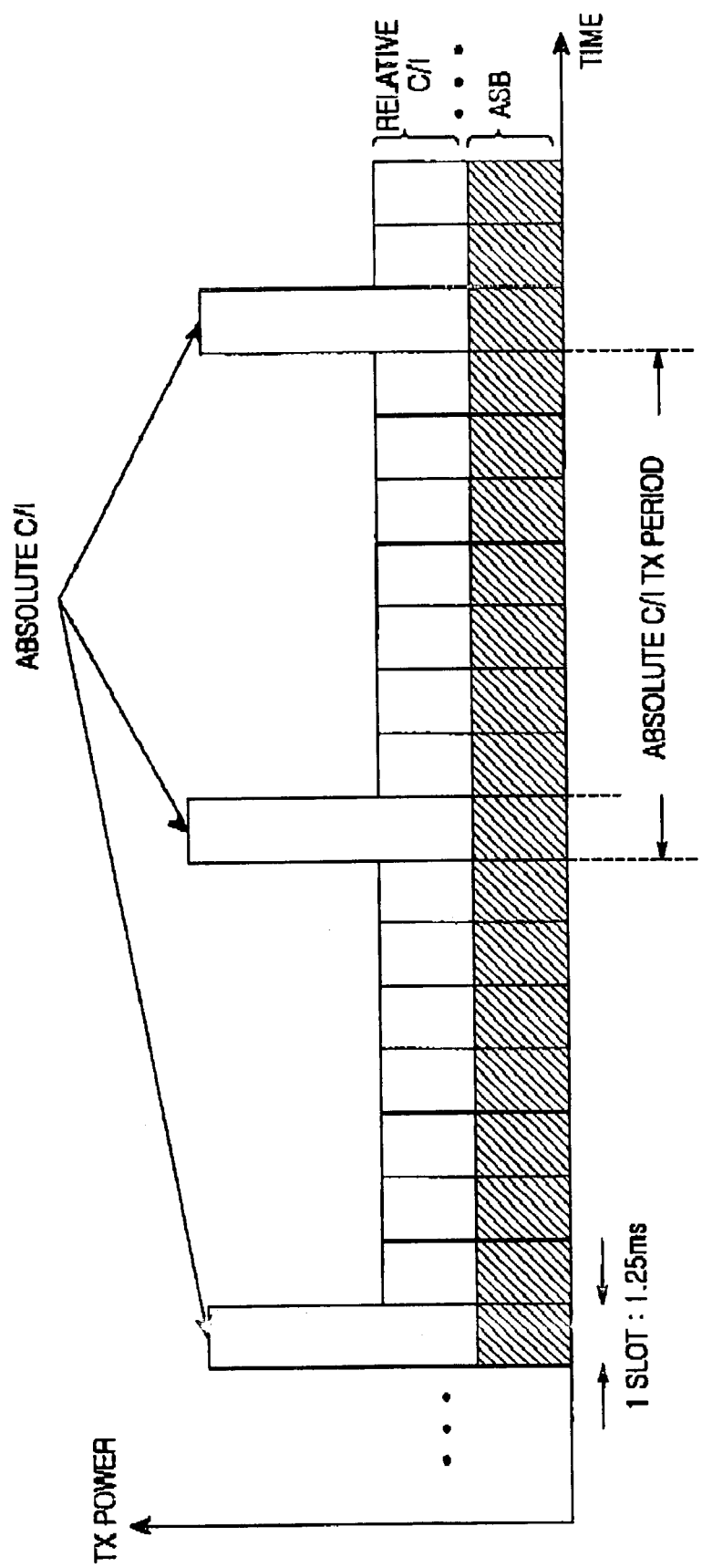
FIG. 9 illustrates forward channel status information transmitted over R-CQICH according to an embodiment of the present invention.

FIG. 9 illustrates forward channel status information transmitted over R-CQICH according to an embodiment of the present invention. As illustrated, absolute C/I information is periodically transmitted at slot positions previously agreed between a base station and a mobile station, and relative C/I information having relatively small number of bits is transmitted at the other slots in the period.

As described above, the present invention reduces an amount of information needed by a mobile station to transmit forward channel status information in a mobile communication system supporting STD, contributing to a decrease in interference occurring in a reverse channel so that a base station can secure increased reverse traffic capacity, thereby increasing reverse transmission capacity.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method for measuring, by a mobile station, status of a forward channel and transmitting the measured status information to a base station in a mobile communication system supporting selective transmit diversity (STD), the method comprising the steps of:
   receiving forward channel signals transmitted from the base station through a plurality of transmission antennas;
   measuring signal strength of each of the received forward channel signals;
   selecting a transmission antenna having a highest measured signal strength by comparing the measured signal strengths;
   generating antenna selection information indicating the selected transmission antenna;
   determining whether to generate forward channel status information being an absolute value of the measured signal strength or a relative value of the measured signal strength;
   generating the forward channel status information based on the determination; and
   transmitting the generated forward channel status information to the base station along with the antenna selection information,
   wherein the absolute value information is transmitted so that the absolute value information does not overlap on a time domain with absolute value information transmitted from other mobile stations to the base station.

2. The method of claim 1, wherein the measured signal strengths are compensated considering a transmission power difference between the transmission antennas, before being compared with each other.

3. The method of claim 1, wherein the relative value information indicates a relative value of the measured signal strength for the selected transmission antenna with respect to measured signal strength for a transmission antenna selected at a previous slot.

4. The method of claim 3, wherein the relative value information is comprised of a small number of bits as compared with the absolute value information.

5. The method of claim 3, wherein the relative value information is transmitted at lower transmission power as compared with the absolute value information.

6. The method of claim 1, wherein the absolute value information indicates the measured signal strength for the selected transmission antenna.

7. The method of claim 1, wherein the signal strength is a C/I (Carrier to Interference).

8. An apparatus for measuring, by a mobile station, status of a forward channel and transmitting the measured status information to a base station in a mobile communication system supporting selective transmit diversity (STD), the apparatus comprising:
   a signal strength measurer for receiving forward channel signals transmitted from the base station through a plurality of transmission antennas, and measuring signal strength of each of the received forward channel signals;
   a transmission controller for determining whether a current slot is a slot to transmit an absolute value or a relative value;
   an information generator for selecting a transmission antenna having highest measured signal strength by comparing the measured signal strengths, generating antenna selection information indicating the selected transmission antenna, and generating, based on the determination of the transmission controller, absolute value information indicating measured signal strength for the selected transmission antenna or relative value information indicating a relative value for measured signal strength for the selected transmission antenna with respect to measured signal strength for a transmission antenna selected at a previous slot; and
   an encoder for encoding the absolute value information or the relative value information along with the antenna selection information so as to transmit,
   wherein the absolute value information is transmitted so that the absolute value information does not overlap on a time domain with absolute value information transmitted from other mobile stations to the base station.

9. The apparatus of claim 8, wherein the signal strength measurer compensates the measured signal strengths considering a transmission power difference between the transmission antennas.

10. The apparatus of claim 8, wherein the encoder encodes the absolute value information or the relative value information, along with the antenna selection information, at a code rate determined according to the total number of bits of the absolute value information and the antenna selection information, or the total number of bits of the relative value information and the antenna selection information.

11. The apparatus of claim 8, wherein the signal strength is a C/I (Carrier to Interference).

12. A method for receiving, by a base station, forward channel status information from a mobile station in a mobile communication system supporting selective transmit diversity (STD), the method comprising the steps of:
   receiving forward channel status information indicating measured signal strength of a forward channel, and antenna selection information indicating an antenna selected by the mobile station among a plurality of antennas included in the base station;
   determining whether the forward channel status information is absolute value information representing measured signal strength for the antenna selected by the mobile station or relative value information representing a relative value with respect to measured signal strength for an antenna selected at a previous slot; and
   updating, based on the determination, previously stored measured signal strength according to the received forward channel status information,
   wherein the absolute value information is transmitted so that the absolute value information does not overlap on a time domain with absolute value information transmitted from other mobile stations to the base station.

13. The method of claim 12, wherein the updating step increases or decreases the previously stored measured signal strength according to relative value information, if the forward channel status information is the relative value information.

14. The method of claim 12, wherein the updating step replaces the previously stored measured signal strength with measured signal strength corresponding to absolute value information, if the forward channel status information is the absolute value information.

15. The method of claim 12, further comprising the step of controlling transmission of forward packet data using the updated measured signal strength.

16. An apparatus for receiving, by a base station, forward channel status information from a mobile station in a mobile communication system supporting selective transmit diversity (STD), the apparatus comprising:
   a decoder for decoding a signal received from the mobile station at a prescribed code rate, to recover forward channel status information indicating measured signal strength of a forward channel and antenna selection information indicating an antenna selected by the mobile station among a plurality of antennas included in the base station;

a reception controller for determining whether the forward channel status information is absolute value information representing measured signal strength for the antenna selected by the mobile station or relative value information representing a relative value with respect to measured signal strength for an antenna selected at a previous slot; and a memory for replacing previously stored measured signal strength with absolute value information, if the forward channel status information is the absolute value information, and updating previously stored measured signal strength according to relative value information, if the forward channel status information is the relative value information, wherein the absolute value information is transmitted so that the absolute value information does not overlap on a time domain with absolute value information transmitted from other mobile stations to the base station.

17. The apparatus of claim 16, wherein the decoder decodes the received signal at a code rate corresponding to the total number of bits of the absolute value information and the antenna selection information, if the forward channel status information is the absolute value information and decodes the received signal at a code rate corresponding to the total number of bits of the relative value information and the antenna selection information, if the forward channel status information is the relative value information.

* * * * *